United States Patent [19]
Loeb

[11] Patent Number: 5,996,277
[45] Date of Patent: Dec. 7, 1999

[54] AUTOMATIC PLANT TRIMMING APPARATUS

[75] Inventor: Carl F. Loeb, 1879 Cascade Ridge Dr., Mount Vernon, Wash. 98273

[73] Assignees: Carl F. Loeb; Duane A. Melcher, both of Mount Vernon, Wash.

[21] Appl. No.: 08/840,556

[22] Filed: Apr. 14, 1997

Related U.S. Application Data

[63] Continuation of application No. 08/378,960, Jan. 27, 1995, abandoned.

[51] Int. Cl.[6] ............................ A01C 29/00; A01G 29/00
[52] U.S. Cl. .............................................................. 47/1.01
[58] Field of Search .............................. 47/1 A, 1.01, 901

[56] References Cited

U.S. PATENT DOCUMENTS

| | | |
|---|---|---|
| 2,592,833 | 4/1952 | Swanson . |
| 2,611,215 | 9/1952 | Johnson ..................................... 47/1 B |
| 3,541,979 | 11/1970 | Lorenzen . |
| 4,327,538 | 5/1982 | Milhem et al. . |
| 5,225,345 | 7/1993 | Suzuki et al. . |
| 5,228,235 | 7/1993 | Ishimoto . |
| 5,254,140 | 10/1993 | Huang . |
| 5,295,325 | 3/1994 | Honda et al. .............................. 47/1 A |
| 5,331,908 | 7/1994 | Loeb . |

FOREIGN PATENT DOCUMENTS

| | | | |
|---|---|---|---|
| 0383410 | 8/1990 | European Pat. Off. ................. | 47/1 B |
| 2408296 | 7/1979 | France ..................................... | 47/1 B |
| 3546445 | 9/1986 | Germany ................................. | 47/1 B |
| 4004826 | 1/1992 | Japan ....................................... | 47/901 |

*Primary Examiner*—Michael J. Carone
*Assistant Examiner*—Joanne C. Downs
*Attorney, Agent, or Firm*—Joan H. Pauly

[57] ABSTRACT

A carrousel (2) has a plurality of spaced apart holders (50) mounted on its outer periphery. Each holder receives a plant unit (90) including a plant with foliage (92) and a root/soil mass (94) received in a container (96). As the carrousel (2) turns, a cam (70) carried by each holder (50) engages a ramp (78) to cause the holder (50) to grip the container (96). The holder (50) then conveys the plant unit (90) through first and second cutting stations (4, 18) at which top and side portions of the foliage (92), respectively, are trimmed. The trimming is accomplished by flail cutters (6, 20, 21). At the side cutting station (18), the plant unit (90) moves between a pair of cutters (20, 21), and a rubber tire (84) rotates the holder (50) and plant unit (90) to provide cutting all the way around the plant unit (90). After exiting the second station (18), the holder (50) releases its grip on the plant unit (90).

26 Claims, 7 Drawing Sheets

,277

AUTOMATIC PLANT TRIMMING APPARATUS

This application is a continuation of application Ser. No. 08/378,960, filed Jan. 27, 1995, now abandoned.

TECHNICAL FIELD

This invention relates to apparatus for automatically processing plants and, more particularly, to an apparatus for automatically trimming plant foliage comprising a power conveyor for conveying plants along a path and first and second cutting stations adjacent to the path for trimming top portions and side portions, respectively, of the foliage.

BACKGROUND INFORMATION

The apparatus of the present invention is intended primarily for use in carrying out a method of growing perennials invented by the present applicant. This method is the subject of U.S. Pat. No. 5,331,908, issued Jul. 26, 1994. The method involves starting a plant in a container and then placing the plant still in the container in a field for further growth. During the ensuing dormant season, the plant is harvested by undercutting feeder roots extending downwardly out of the container and removing the plant and container from the field. After harvesting, the plant foliage is preferably trimmed for transportation or storage. The apparatus of the present invention has been developed by the applicant to automate the trimming procedure.

SUMMARY OF THE INVENTION

The present invention is directed toward apparatus for automatically trimming foliage of plant units. As used herein, the term "plant unit" means an individual plant that has foliage and a root system. In most cases, there is soil associated with the root system, with or without a binder for maintaining the soil in a stable configuration. The unit may or may not further include a container in which the root system and soil are positioned.

According to a basic aspect of the invention, the apparatus comprises a powered conveyor and first and second cutting stations. The conveyor has a conveyor path along which it conveys plant units placed on the conveyor. Each of the cutting stations is positioned adjacent to the path. The first cutting station has a first cutting device positioned above the path to trim top portions of the foliage. The second cutting station has a second cutting device positioned laterally adjacent to the path to trim side portions of the foliage. The first and second cutting stations may be combined together at one location, but preferably are spaced apart along the conveyor path. Either cutting station may be placed downstream of the other, and the configuration of each cutting station and its cutting device may be varied considerably.

At the second cutting station, the second cutting device preferably comprises a pair of cutters positioned on opposite sides of the path so that a plant unit conveyed along the path passes between the cutters. Each cutter is preferably provided in the form of a flail cutter. A preferred feature is a rotator located at the second cutting station and positioned to turn a plant unit to enable the second cutting device to trim all the way around the plant unit. In its preferred form, the rotator comprises a rotating disk positioned adjacent to the path to frictionally engage the plant unit. This arrangement facilitates the provision of another preferred feature, the conveying of plant units continuously along the conveyor path past the cutting stations.

Another preferred feature of the invention is the inclusion in the conveyor of a plurality of spaced apart holders. Each holder is configured to receive a plant unit and convey it along said path and to hold the plant unit in position during trimming of foliage at the stations. Like the rotator feature, the holder feature facilitates the preferred continuous conveying of plant units. The holders also facilitate the preferred use of flail cutters at both cutting stations. The preferred embodiment of the apparatus includes a ramp adjacent to the path. Each holder includes gripping portions and a projecting portion. The projecting portion is positioned to engage the ramp to push the gripping portions into gripping engagement with a plant unit received by the holder. A spring is provided to bias the gripping portions away from gripping engagement with the plant unit to facilitate removal of the plant unit following the trimming of the foliage. In embodiments of the invention having both the rotator feature and the holder feature, the rotator preferably engages a holder to turn a plant unit gripped thereby. Alternatively, whether or not the plant unit is being carried by a holder, the rotator may directly engage the plant unit to turn the plant unit. In the preferred embodiment, the rotator comprises a rotating disk positioned adjacent to the path to engage the plant unit by frictionally engaging the holder.

The apparatus of the invention provides an efficient and cost effective means for trimming the foliage of plants. The apparatus makes it possible to quickly and accurately trim both the top and sides of a large number of plants with minimum trauma to the plants that might affect future health and/or growth of the plants. The operation of the apparatus is highly reliable and versatile. Plant units with or without containers can be processed using the apparatus, and, in the preferred embodiment, the width and height of the foliage remaining after trimming can be adjusted to accommodate different types of plants and/or the requirements of different situations. The preferred holding arrangement for each of the plant units holds the plants securely in cutting position during the trimming operations and also provides for easy removal of the plant units from the apparatus. The biasing spring of the preferred embodiment of the holder automatically releases the grip of the holder on a plant unit following the trimming operation. As noted above, the preferred features of the invention enable the continuous conveying of plant units through the apparatus to help maximize the efficiency of the trimming operation.

BRIEF DESCRIPTION OF THE DRAWINGS

In the drawings, like element designations refer to like parts throughout, and.

BEST MODE FOR CARRYING OUT THE INVENTION

The drawings show apparatus that is constructed according to the invention and that constitutes the best mode for carrying out the invention currently known to the applicant. The apparatus is designed for automatically trimming foliage of plant units, each of which includes a plant having foliage and roots and, preferably, a container receiving the roots. The apparatus may be used for trimming the foliage of various types of plants and is particularly well-suited for trimming herbaceous perennials of the type described in the applicant's above-cited U.S. Pat. No. 5,331,908.

Figure 12:
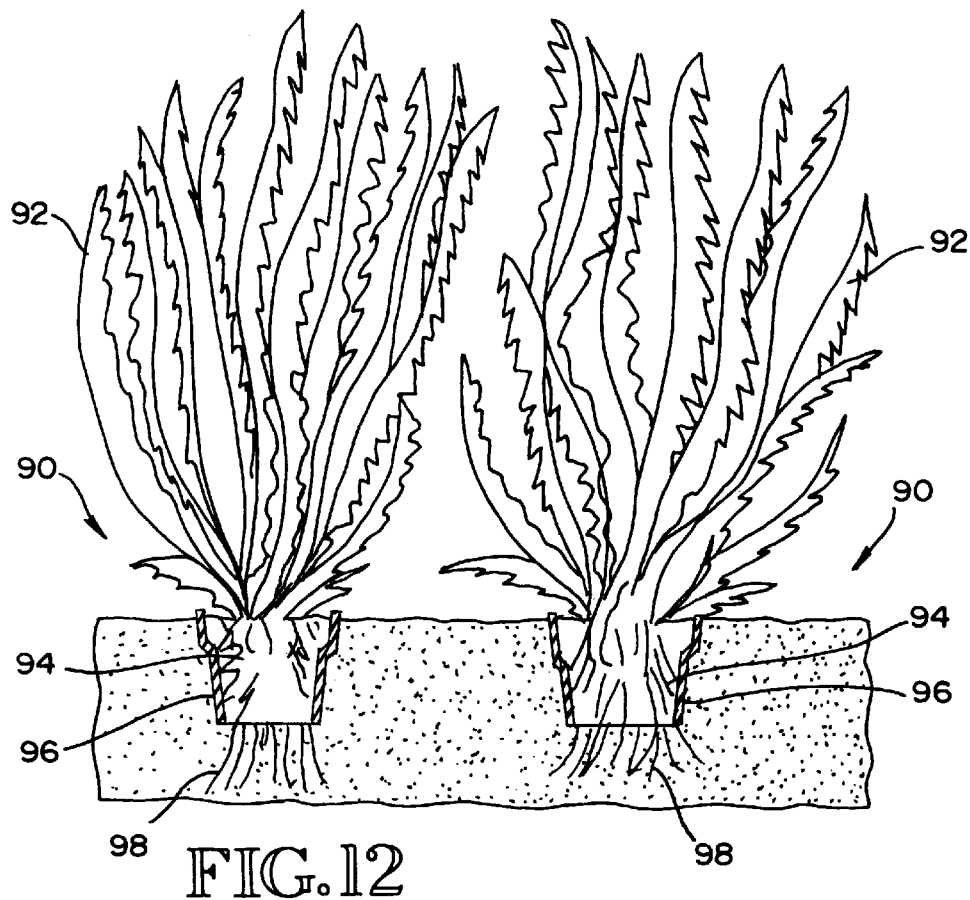
FIG. 12 is a sectional view of plant units growing in a field, with e foliage shown in elevation.

FIG. 12 shows an example of a type of plant unit suitable for processing using the apparatus of the invention. Two plant units 90 with foliage 92 and a root and soil mass 94 in a container 96 are shown in FIG. 12. The plant units 90 are still in a field with the containers 96 in the soil and feeder roots 98 extending downwardly from the open container bottoms into the soil. When the plant units 90 are harvested during their dormant season, the feeder roots 98 are undercut and the containers 96 are removed from the soil. The plant units 90 are then ready for foliage trimming using the apparatus of the invention.

The apparatus includes a powered conveyor having a conveyor path along which it conveys plant units placed on the conveyor. Referring to the drawings and especially FIGS. 1 and 2, the conveyor preferably takes the form of a carrousel 2. The carrousel 2 has a flat circular horizontal top surface with an outer cylindrical rim 3 surrounding and depending downwardly therefrom. A suitable motor of a known type is provided to turn the carrousel 2 about the axis of the circular top. In the preferred embodiment, an electric motor (not shown) is positioned under the circular top of the carrousel 2 to rotate the carrousel 2.

Figure 2:
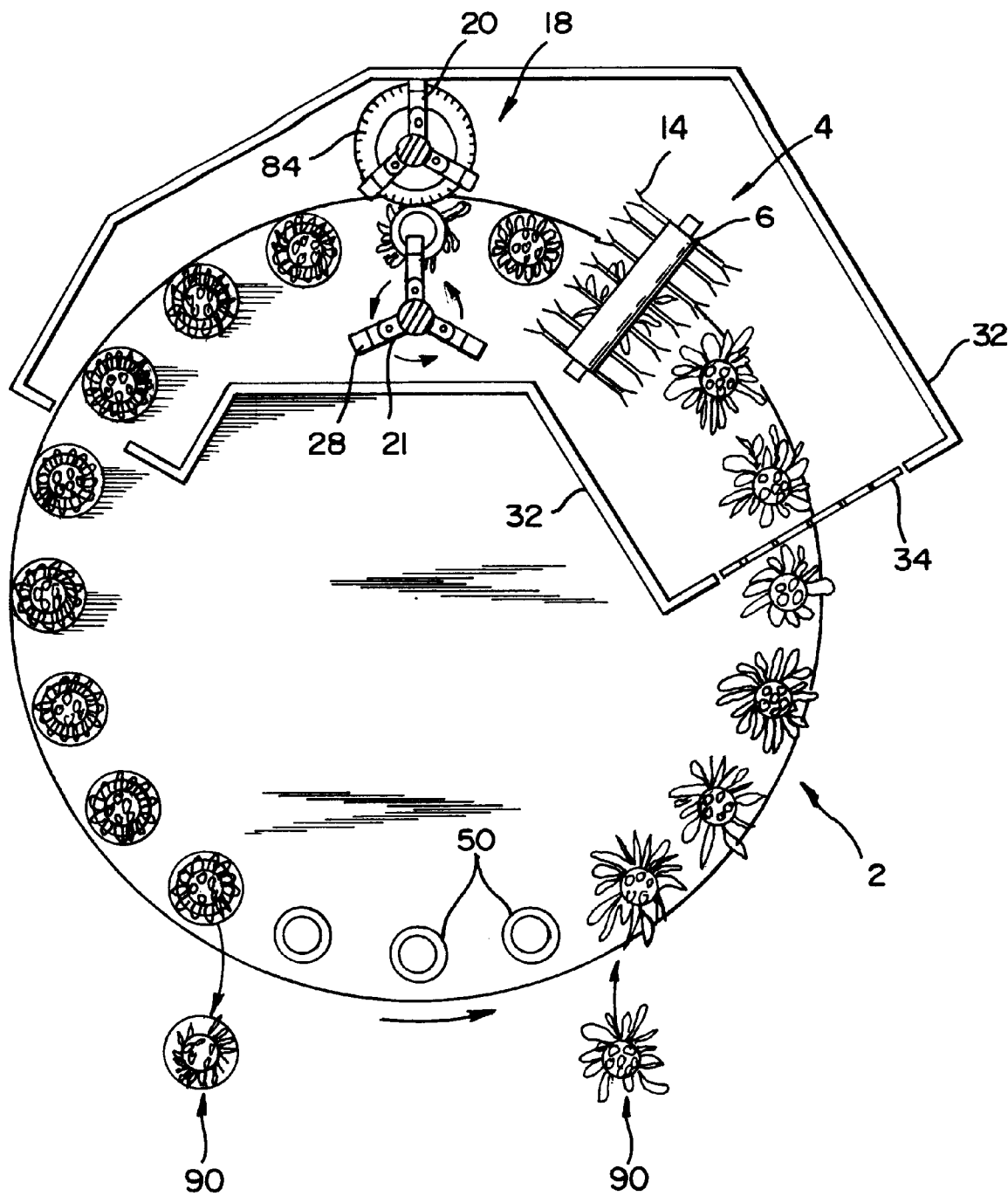
FIG. 2 is a partially schematic top plan view of the apparatus and plant units shown in FIG. 1.

The carrousel 2 is operated to convey plant units 90 along a circular conveyor path coaxial with the carrousel 2. Referring to FIG. 2, first and second cutting stations 4, 18 are positioned adjacent to the path to trim the foliage 92 of the plant units 90 being conveyed along the path. At the first station 4, a first cutting device 6 is provided and is positioned above the path to trim top portions of the foliage 92. A second cutting device 20, 21 is provided at the second station 18 and is positioned laterally adjacent to the path to trim side portions of the foliage 92. The second cutting device 20, 21 preferably includes a pair of cutters 20, 21 positioned on opposite sides of the path so that a plant unit conveyed along the path passes between the cutters 20, 21. Preferably, all three cutters 6, 20, 21 are flail cutters.

Figure 4:
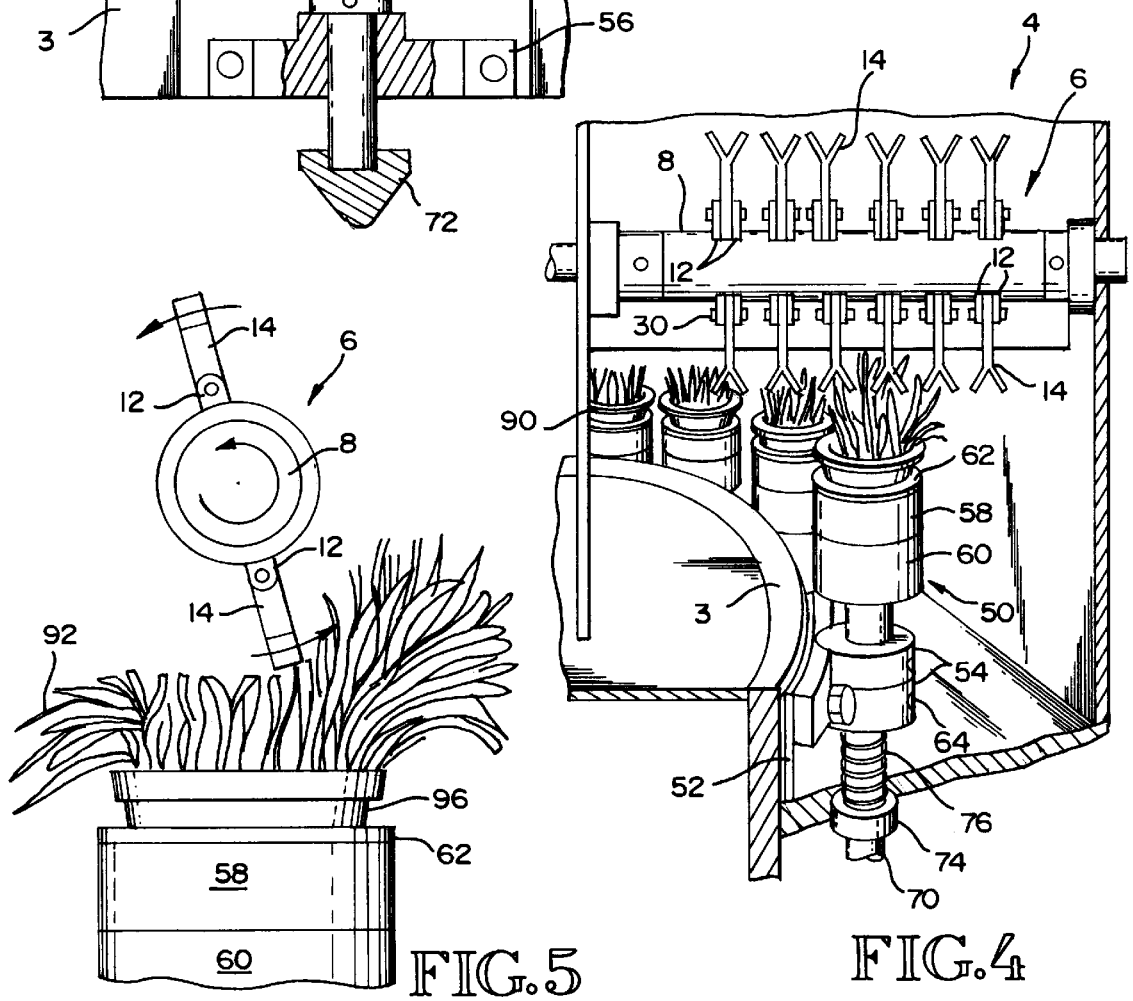
FIG. 4 is a fragmentary pictorial view of the first cutting station shown in FIGS. 1 and 2.
Figure 5:
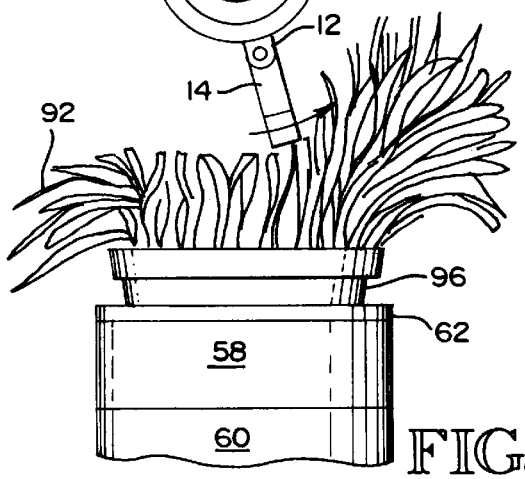
FIG. 5 is an end view of the flail cutter shown in FIG. 4 illustrating the trimming of the top portions of a plant's foliage.
Figure 6:
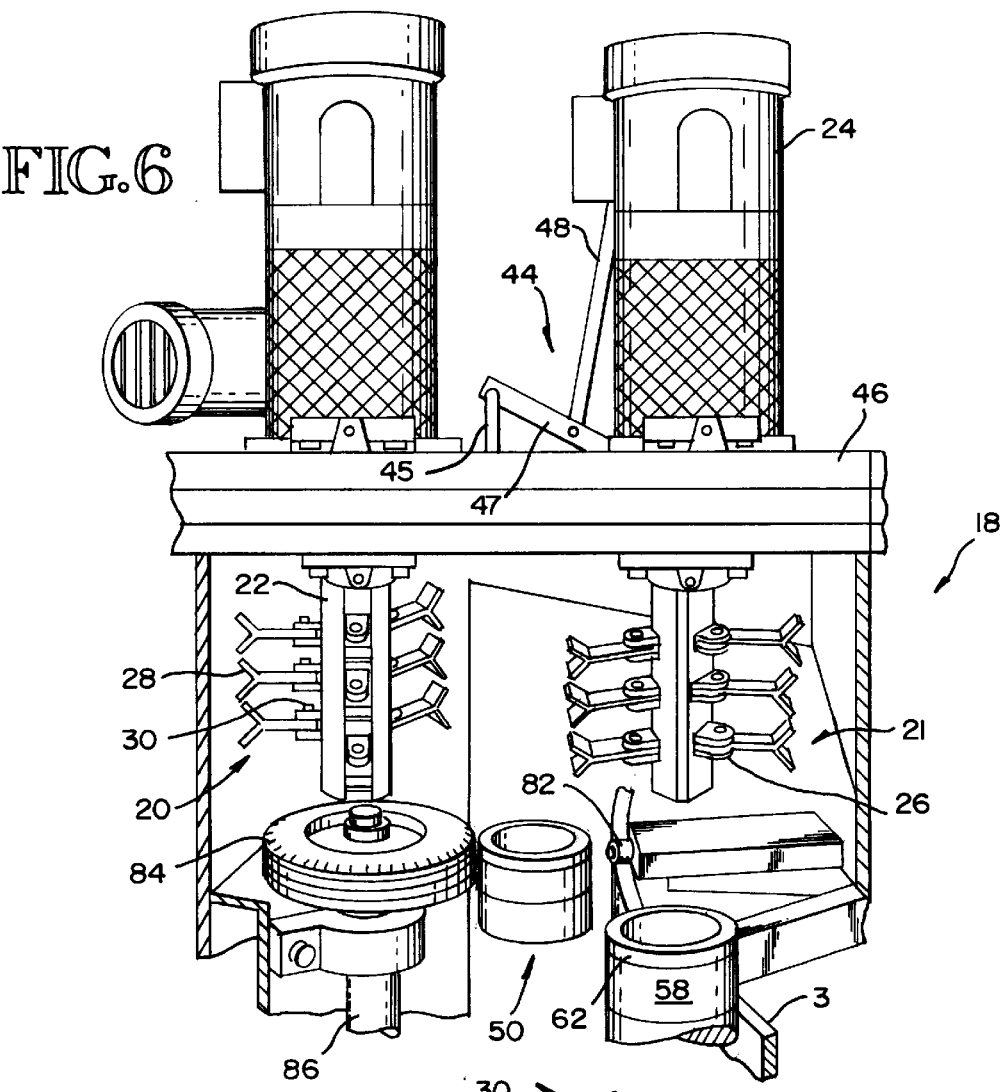
FIG. 6 is a fragmentary pictorial view of the second cutting station shown in FIGS. 1 and 2.
Figure 7:
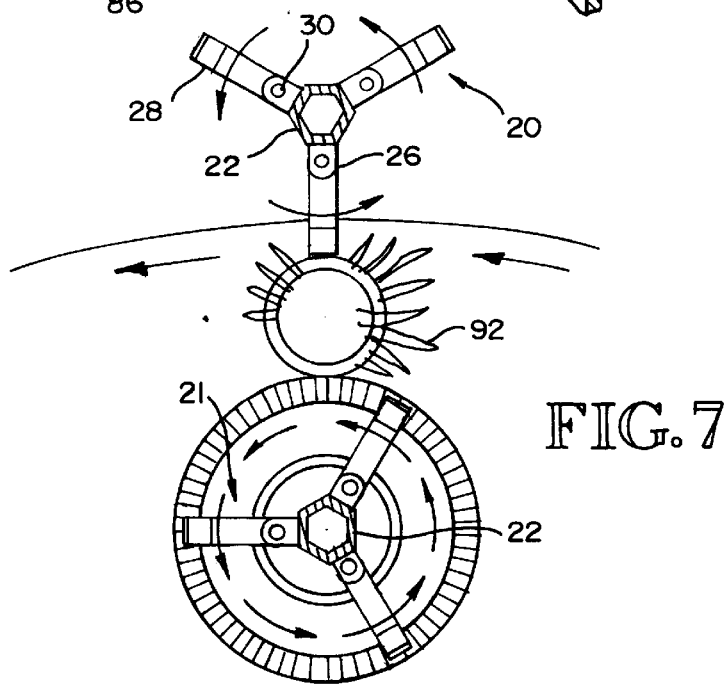
FIG. 7 is a top view of the cutters shown in FIG. 6 illustrating the trimming of side portions of a plant's foliage.
Figure 10:
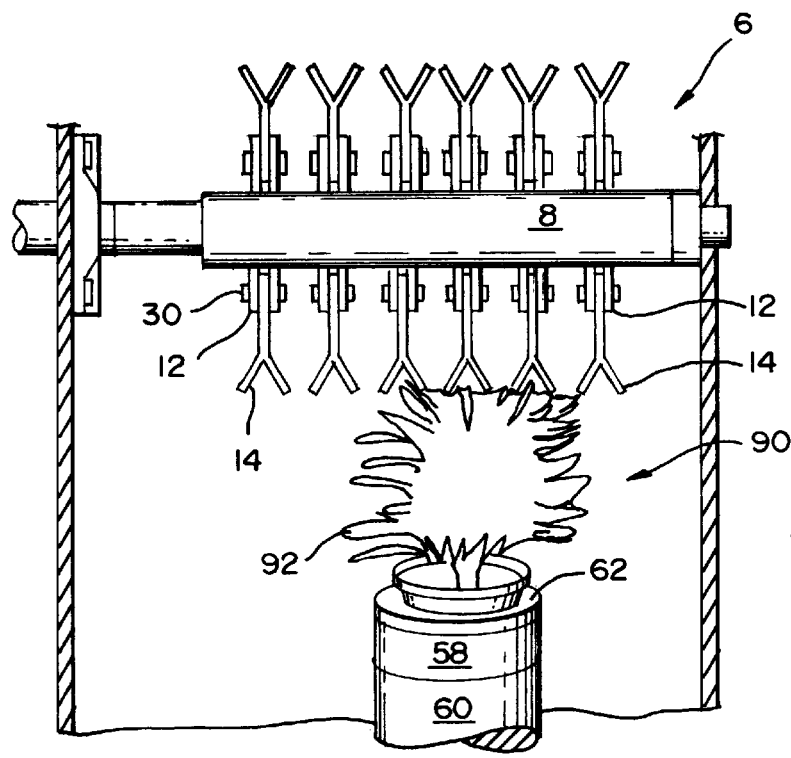
FIG. 10 is an elevational view illustrating a plant unit leaving the first cutting station, with parts shown in section.
Figure 11:
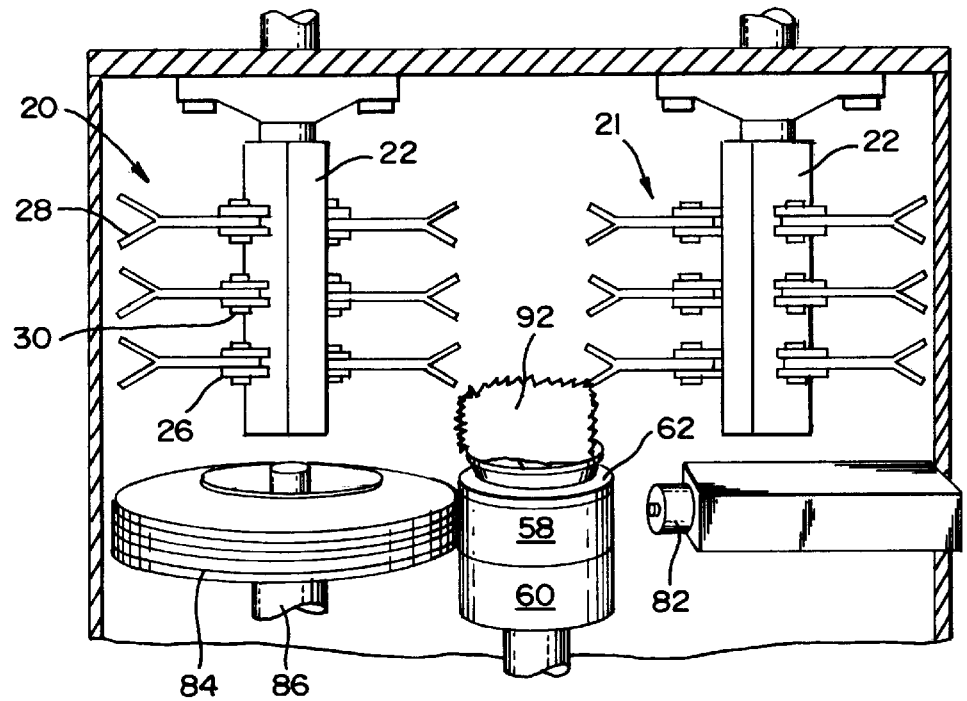
FIG. 11 is like FIG. 10 except that it shows a plant unit exiting the second cutting station.

Referring to FIGS. 4, 5, and 10, the cutter 6 at the first cutting station 4 includes a horizontally oriented shaft 8 turned by a motor (not shown). In the preferred embodiment, the motor is hydraulically operated. Two axially extending rows of brackets 12 are secured to diametrically opposite portions of the outer cylindrical surface of the shaft 8. The brackets 12 are arranged in pairs, with each pair receiving a Y-shaped flail blade 14. As shown, there are six pairs of brackets 12 and six blades 14 in each row, but the number of brackets and blades may be varied. Referring to FIGS. 6, 7, and 11, each of the cutters 20, 21 at the second station 18 includes a vertically oriented shaft 22 rotated by a motor 24. Three axially extending rows of brackets 26 are secured to the outer cylindrical surface of the shaft 22 spaced 120° apart. As in the cutter 6 shown in FIGS. 4, 5, and 10, the brackets 26 are arranged in pairs, each of which receives a Y-shaped flail blade 28. In all three cutters 6, 20, 21, the blades 14, 28 are loosely pivoted in their brackets 12, 26 by through bolts 30. During operation of the cutters 6, 20, 21, centrifugal force maintains the blades 14, 28 in their radially extending operation position shown in FIGS. 5 and 7. If a blade 14, 28 strikes something solid, it will pivot in its bracket 12, 26 to avoid damage to the cutter 6, 20, 21.

The apparatus is preferably provided with a metal shield 32, shown in FIG. 2. The shield 32 may take the form of a metal plate wall extending from the level of the top of the carrousel 2 to an upper end above the highest point of the blade operation. It helps to contain the plant debris created by the trimming operation and protects personnel in the area from contact with the blades 14, 28. In addition to the metal plate shield 32, the entry opening at the upstream end of the shielded area is preferably provided with a rubber strip shield 34, shown in FIGS. 1 and 2.

To maximize the flexibility of the apparatus, the positions of the cutters 6, 20, 21 are preferably adjustable. In the preferred embodiment, the height of the horizontally oriented cutter 6 is adjustable to allow adjustment of the height of the foliage 92 remaining after trimming of the top portion of the foliage 92 at the first cutting station 4. Similarly, the distance between the two vertically oriented cutters 20, 21 is adjustable to permit adjustment of the width or diameter of the remaining foliage 92 following side trimming at the second cutting station 18. The adjustments are accomplished by moving the horizontal cutter 6 up and down and the vertical cutters 20, 21 horizontally toward and away from each other. Controls 36 are provided for actuating hydraulic motors to accomplish the desired height and/or width adjustments.

Figure 9:
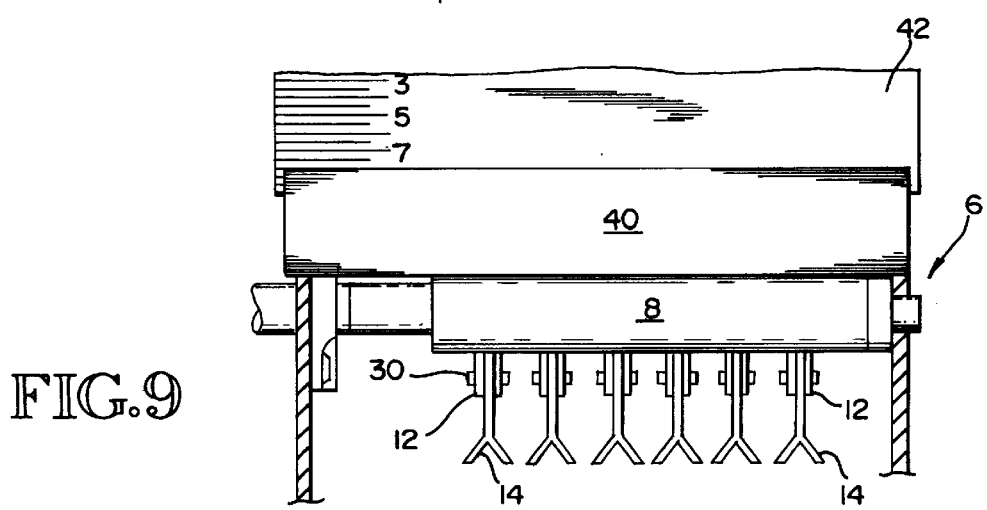
FIG. 9 is an elevational view of a portion of the first cutting station shown in FIG. 4 illustrating the trim height gauge.

Accurate adjustments are facilitated by the provision of gauges to permit an operator of the apparatus to determine the actual blade locations. FIG. 9 illustrates a gauge for determining the height of the horizontal cutter 6. The gauge consists of a metal plate 42 with indicia thereon positioned behind a fixed plate 40. The position of the top of the plate 40 relative to the indicia indicates the number of inches of foliage height remaining after trimming. A pivoting width gauge 44 is provided at the second station 18 to indicate the amount of foliage left extending beyond the outer rim of the plant unit holder (described below) following trimming. The gauge 44 has a first pivot leg 45 pivotably attached to a fixed support 46 and a second leg pivotably attached to one of the cutter housings. The two legs are connected by a link 47 which supports a pointer 48. The pointer 48 pivots along an indicia plate (not shown) as the positions of the two cutters 20, 21 are adjusted.

Figure 1:
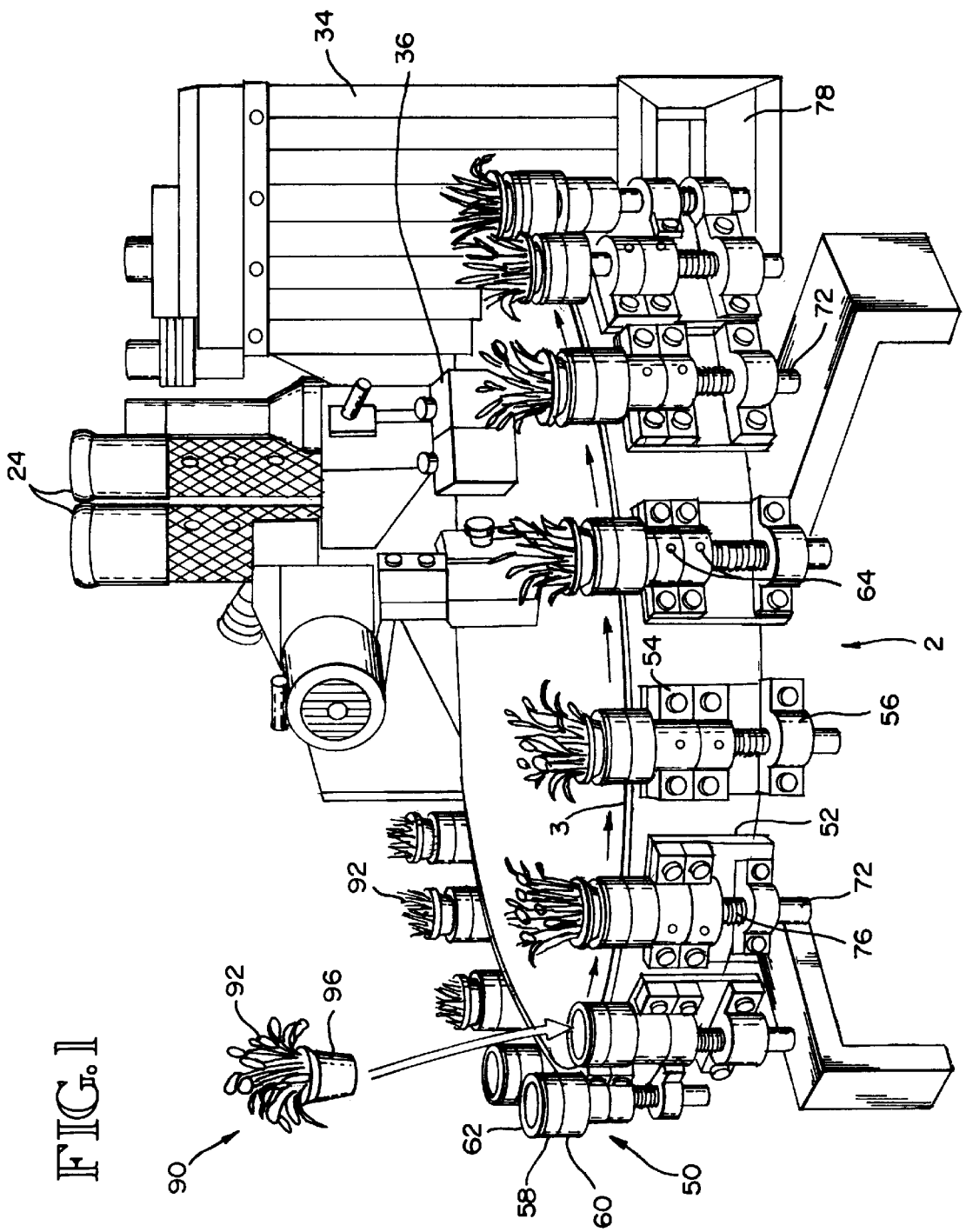
FIG. 1 is a pictorial view of the preferred embodiment of the apparatus of the invention in use to trim the foliage of a plurality of plant units.

Referring to FIGS. 1, 3, 4, and 8, the apparatus preferably includes a plurality of spaced apart holders 50 for the plant units 90. Each holder 50 is configured to receive a plant unit 90 and convey it along the circular conveyor path. The holder 50 also holds the plant unit 90 received therein in position during trimming of the foliage 92 at the cutting stations 4, 18. Each holder 50 is mounted on the outer cylindrical surface of the cylindrical rim 3 of the carrousel 2 by means of a mounting plate 52 and upper and lower brackets 54, 56. The holder 50 comprises an outer cup 58, 60 with a rubber grip 62 positioned at its top. The cup has an upper rubber portion 58 and a lower metal portion 60. The rubber of the upper portion 58 facilitates frictional gripping of the outer cup, as described further below. The lower metal portion 60 is welded to a sleeve 63 that is restrained from movement relative to the upper brackets 54 by set screws 64 (FIG. 1).

Figure 3:
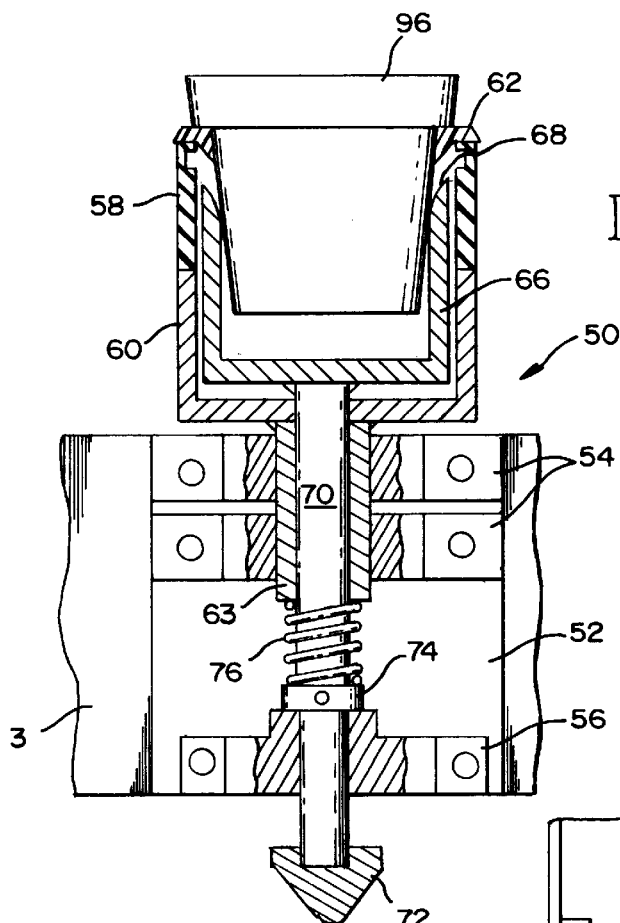
FIG. 3 is a sectional view of one of the holders shown in FIG. 1 supporting a plant unit container, with parts shown in elevation.
Figure 8:
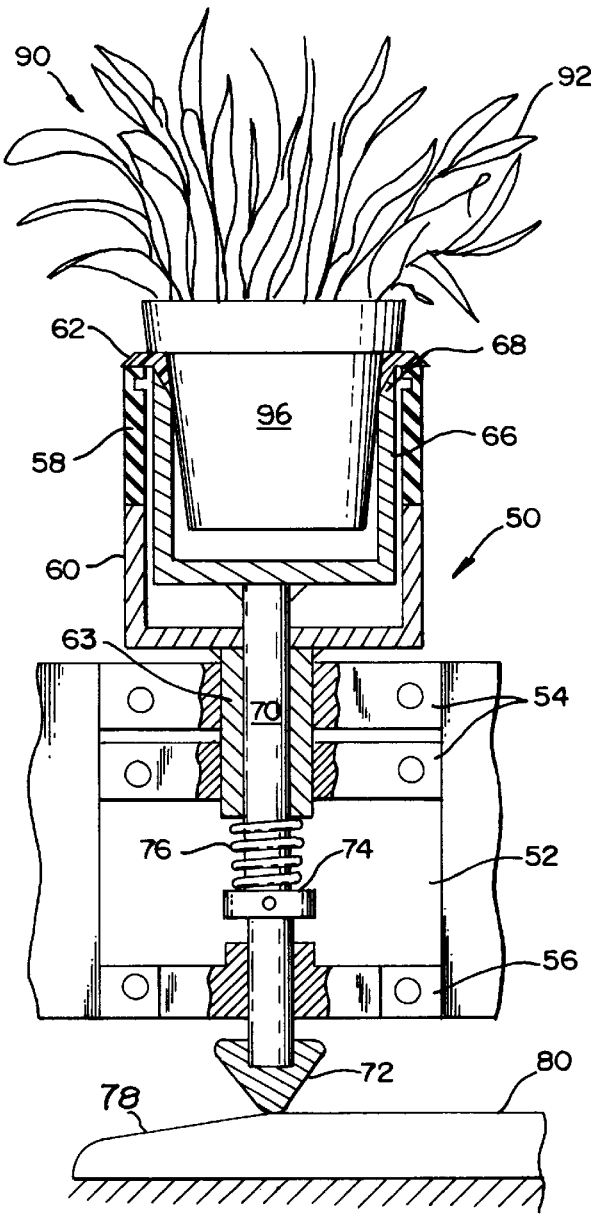
FIG. 8 is a sectional view like FIG. 3 except that it shows a plant in the container and illustrates activation of the gripping portions of the holder by engagement with a ramp.

Referring to FIGS. 3 and 8, the holder 50 also includes an inner cup 66 slidably received in the outer cup 58, 60. The upper circular rim 68 of the inner cup is beveled for the purpose described below. The bottom of the cup 66 has a shaft 70 depending downwardly therefrom. The shaft 70 extends downwardly through the brackets 54, 56 and sleeve 63 and terminates in a lower cam 72. The shaft 70 has a radial shoulder formed by a nut 74 surrounding it above and adjacent to the lower bracket 56. A coil spring 76 surrounds the shaft 70 between the upper and lower brackets 54, 56. The opposite ends of the spring 76 abut the shoulder 74 and the fixed bottom end of the sleeve 63. The inner cup 66 and shaft 70 are slidable vertically as a unit relative to the outer cup 58, 60 and the carrousel 2 and brackets 54, 56 secured thereto. The spring 76 biases the cup 66 into its downward position shown in FIG. 3.

FIG. 8 illustrates the inner cup 66 of the holder 50 moved into an upper gripping position. The apparatus is provided with a ramp 78 below and adjacent to the conveyor path for moving the inner cup 66 upwardly to activate the gripping action of the holder 50. As shown in FIG. 8, when the cup 66 moves into its upper position, it engages the rubber grip 62 carried by the outer cup 58, 60. This urges the grip 62 radially inwardly to grip the container 96 of a plant unit 90 received in the inner cup 66. The ramp 78 is positioned so that, as the plant unit 90 moves into the shielded cutting area, the lower cam 72 on the downwardly projecting shaft 70 engages the ramp 78 to push the shaft 70 and inner cup 66 upwardly to thereby urge the rubber grip 62 into gripping engagement with the plant unit 90. The upstream end of the ramp 78 is sloped, as shown in FIG. 8, to cam the shaft 70 upwardly. Downstream of the sloping portion, the ramp has a flat portion 80 that extends below and adjacent to the conveyor path to a point beyond the second cutting station 18. This maintains the gripping engagement of the plant unit 90 throughout the trimming procedure at both cutting stations 4, 18. The downstream end of the ramp 78 is also sloped to release the engagement of the plant unit 90 following the trimming. This enables the trimmed plant unit 90 to be easily removed from its holder 50 as it exits the shielded cutting area.

Preferably, a cam follower bearing 82 is provided at the second cutting station 18, as shown in FIGS. 6 and 11. The bearing 82 exerts a downward force on the carrousel 2 and thereby prevents the carrousel 2 from moving upwardly as the inner cups 66 of the holders 50 are urged upwardly. The bearing 82 is in rolling engagement with the top of the cylindrical outer rim 3 of the carrousel 2.

In most situations, it is desirable to trim the foliage 92 all the way around the plant unit 90. In the preferred embodiment, this is accomplished by providing a rotator at the second cutting station. The rotator is positioned to engage the plant unit 90 and turn it to enable the cutters 20, 21 to trim the sides of the foliage 92 all the way around the unit 90. The rotator preferably comprises a rotating disk positioned adjacent to the conveyor path to frictionally engage the holder 50. Referring to FIGS. 6, 7, and 11, in preferred form, the rotating disk comprises a rubber tire 84 mounted on a vertical shaft 86. A suitable drive motor (not shown) is provided to rotate the shaft 86 and rubber tire 84 about the shaft axis. The outer circumferential surface of the tire 84 frictionally engages the rubber upper cylindrical outer surface 58 of the outer cup 58, 60 to turn the holder 50 and the plant unit 90 gripped thereby about the axis of the holder shaft 70. Since the surface of the tire 84 is resilient, frictional engagement occurs long enough for the plant unit 90 to be turned at least 180°, preferably 360°, to provide cutting all the way around the unit 90.

The overall operation of the apparatus is illustrated in FIGS. 1 and 2. As the carrousel 2 turns, plant units 90 are placed in the holders 50. At present, it is contemplated that the positioning of the plant units 90 will generally be done manually. As the plant units 90 move with the carrousel 2, the lower cams 72 on the holders 50 engage the ramp 78 to activate the gripping action of the holders 50 on the plant units 90, as illustrated in FIG. 8. The holders 50 with the plant units 90 gripped thereby proceed on to the first cutting station 4 where the top portions of the foliage 92 are trimmed, as illustrated in FIGS. 4 and 5. FIG. 10 illustrates a holder 50 and a plant unit 90 carried thereby exiting the first cutting station 4. From the first cutting station 4, the holder 50 and plant unit 90 proceed to the second cutting station 18, shown in FIGS. 6, 7, and 11. FIG. 7 illustrates the trimming of the side portions of the foliage 92 at the second station 18. FIG. 11 illustrates the holder 50 and plant unit 90 exiting the second cutting station 18. After exiting the second cutting station 18, the holder/plant unit 50, 90 exits the shielded area, and the gripping engagement of the plant unit 90 by the holder 50 is released by action of the spring 76. Then, the trimmed plant unit 90 may be easily removed from the holder 50, manually or automatically. In the illustrated apparatus, the plant unit 90 is removed manually.

Throughout the trimming operation, the rotational motion of the carrousel 2 is continuous, rather than intermittent. Thus, the carrousel 2 conveys the plant units 90 continuously along the circular conveyor path past the cutting stations 4, 18. The capability of completely trimming the plant units 90 without interrupting the motion of the carrousel 2 while a plant unit 90 is being trimmed at one of the cutting stations 4, 18 is achieved primarily by the inclusion of the holder grip and rotator features described above. The overall result is maximized efficiency of the trimming operation. An optimal speed of the carrousel 2 is, for example, three revolutions per minute.

Figure 13:
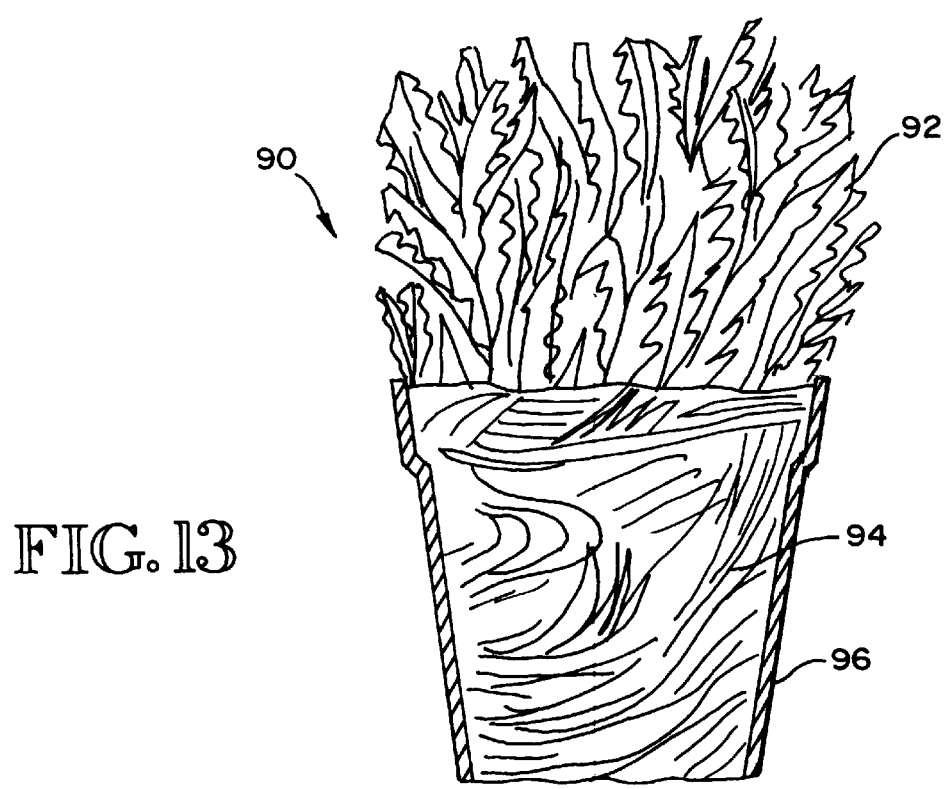
FIG. 13 is an elevational view of a plant unit following trimming by the apparatus of the invention, with the plant unit container shown in section.

FIG. 13 illustrates the plant unit 90 following the trimming operation and its removal from the carrousel 2. As described in the applicant's above-cited U.S. Pat. No. 5,331, 908, the trimmed plant unit 90 is in suitable condition for storage or transportation pending replanting at the commencement of a subsequent growing season.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. Apparatus for automatically trimming foliage of plant units, comprising:
   a powered conveyor having a conveyor path along which it conveys plant units placed on the conveyor;

a first cutting station adjacent to said path and having a first cutting device positioned above said path to trim top portions of said foliage; and a second cutting station adjacent to said path and separate from said first cutting station, said second cutting station having a second cutting device positioned laterally adjacent to said path to trim side portions of said foliage;

said conveyor path extending to and past each of said first and second cutting stations to convey plant units to and from said stations.

2. The apparatus of claim 1, in which each said cutting device comprises a flail cutter.

3. Apparatus for automatically trimming foliage of plant units, comprising:

a powered conveyor having a conveyor path along which it conveys plant units placed on the conveyor;

a first cutting station adjacent to said path and having a first cutting device positioned above said path to trim top portions of said foliage; and a second cutting station adjacent to said path and spaced from said first cutting station, said second cutting station having a second cutting device positioned laterally adjacent to said path to trim side portions of said foliage;

said conveyor path extending to and past each of said first and second cutting stations to convey plant units to and from said stations.

4. The apparatus of claim 3, in which said second cutting device comprises a pair of cutters positioned on opposite sides of said path so that a plant unit conveyed along said path passes between said cutters.

5. The apparatus of claim 4, in which each of said cutters comprises a flail cutter.

6. The apparatus of claim 5, in which said first cutting device comprises a flail cutter.

7. The apparatus of claim 4, in which said conveyor includes a plurality of spaced apart holders, each said holder being configured to receive a plant unit and convey it along said path and to hold the plant unit in position during trimming of said foliage at said stations.

8. The apparatus of claim 3, in which said conveyor includes a plurality of spaced apart holders, each said holder being configured to receive a plant unit and convey it along said path and to hold the plant unit in position during trimming of said foliage at said stations.

9. The apparatus of claim 3, in which each said cutting device comprises a flail cutter.

10. Apparatus for automatically trimming foliage of plant units, comprising:

a powered conveyor having a conveyor path along which it conveys plant units placed on the conveyor;

a first cutting station adjacent to said path and having a first cutting device positioned above said path to trim top portions of said foliage; and a second cutting station adjacent to said path and having a second cutting device positioned laterally adjacent to said path to trim side portions of said foliage;

in which said conveyor includes a plurality of spaced apart holders, each said holder being configured to receive a plant unit and convey it along said path and to hold the plant unit in position during trimming of said foliage at said stations; and in which the apparatus includes a ramp adjacent to said path; and each said holder includes gripping portions, a projecting portion positioned to engage said ramp to push said gripping portions into gripping engagement with a plant unit received by the holder, and a spring biasing said gripping portions away from gripping engagement with the plant unit.

11. The apparatus of claim 10, comprising a rotator located at said second cutting station and positioned to engage said holder to turn a plant unit gripped thereby to enable said second cutting device to trim all the way around the plant unit.

12. The apparatus of claim 11, in which said path is arcuate, and said rotator comprises a rotating disk positioned adjacent to said path to frictionally engage said holder.

13. The apparatus of claim 11, in which each said cutting device comprises a flail cutter.

14. The apparatus of claim 10, in which said second cutting device comprises a pair of cutters positioned on opposite sides of said path so that a plant unit conveyed along said path passes between said cutters.

15. The apparatus of claim 14, comprising a rotator located at said second cutting station and positioned to engage said holder to turn a plant unit gripped thereby to enable said second cutting device to trim all the way around the plant unit.

16. The apparatus of claim 15, in which each of said cutters of said second cutting device comprises a flail cutter.

17. Apparatus for automatically trimming foliage of plant units, comprising:

a powered conveyor having a conveyor path along which it conveys plant units placed on the conveyor;

a first cutting station adjacent to said path and having a first cutting device positioned above said path to trim top portions of said foliage; and a second cutting station adjacent to said path and having a second cutting device positioned laterally adjacent to said path to trim side portions of said foliage;

in which said conveyor includes a plurality of spaced apart holders, each said holder being configured to receive a plant unit and convey it along said path and to hold the plant unit in position during trimming of said foliage at said stations; and in which each said cutting device comprises a flail cutter.

18. The apparatus of claim 17, in which said conveyor conveys plant units continuously along said path past said cutting stations.

19. Apparatus for automatically trimming foliage of plant units, comprising:

a powered conveyor having a conveyor path along which it conveys plant units placed on the conveyor;

a first cutting station adjacent to said path and having a first cutting device positioned above said path to trim top portions of said foliage; and a second cutting station adjacent to said path and having a second cutting device positioned laterally adjacent to said path to trim side portions of said foliage;

said apparatus comprising a rotator located at said second cutting station and positioned to turn a plant unit to enable said second cutting device to trim all the way around the plant unit.

20. The apparatus of claim 19, in which said path is arcuate, and said rotator comprises a rotating disk positioned adjacent to said path to frictionally engage the plant unit.

21. The apparatus of claim 20, in which said conveyor conveys plant units continuously along said path past said cutting stations.

22. The apparatus of claim 19, in which each said cutting device comprises a flail cutter.

23. The apparatus of claim 19, in which said second cutting device comprises a pair of cutters positioned on opposite sides of said path so that a plant unit conveyed along said path passes between said cutters.

24. The apparatus of claim 23, in which said path is arcuate, and said rotator comprises a rotating disk positioned adjacent to said path to frictionally engage the plant unit.

25. The apparatus of claim 24, in which said conveyor conveys plant units continuously along said path past said cutting stations.

26. The apparatus of claim 23, in which each of said cutters of said second cutting device comprises a flail cutter.

* * * * *